July 6, 1926.
W. M. WHITE
VALVE
Filed July 7, 1923

1,591,903

Inventor
W. M. White
by
Attorney

Patented July 6, 1926.

1,591,903

UNITED STATES PATENT OFFICE.

WILLIAM M. WHITE. OF MILWAUKEE, WISCONSIN.

VALVE.

Application filed July 7, 1923. Serial No. 649,995.

This invention relates in general to improvements in the construction and operation of valves, and relates more specifically to improved means for sealing the joints between valves and their seatings.

An object of the invention is to provide a valve structure which is simple in construction and efficient in operation.

It has been found practically impossible with prior butterfly valve structures of the type in which a single disk is tiltable about a diametral axis of the disk transverse to the flow past the valve, to eliminate leakage past all portions of the valve periphery when the same is in closed position. While valves of this type are ordinarily machined to snugly fit against their seatings with the valves in closed position, it is found impossible to maintain a snug fit under operating conditions. In butterfly valves of large diameter which are subjected to relatively high fluid pressure, the pressure frequently distorts either the valve body or the casing or both, thereby tending to leave gaps between the valve bodies and the seatings, when the valves are in closed position. These undesirable leakage permitting gaps frequently exist at various places around the valve periphery and positively prevent tight closure of such valves.

The present invention contemplates provision of simple, efficient and automatically operable means for preventing leakage past a valve of the butterfly type. In accordance with the present invention the periphery of the valve disk or body is provided with one or more distortable packing segments adapted to be firmly engaged by the valve seating and to be held against the seating by fluid under pressure. By providing such distortable segments, the valve is effectively packed when in closed position regardless of the fact that either the valve body or the casing or both may be distorted by the fluid under pressure acting against the valve and casing.

A clear conception of an embodiment of the invention and of the operation of valve mechanism constructed in accordance therewith, may be had by referring to the drawing accompanying and forming a part of this specification in which like reference characters designate the same or similar parts in the several views.

Figure 1:
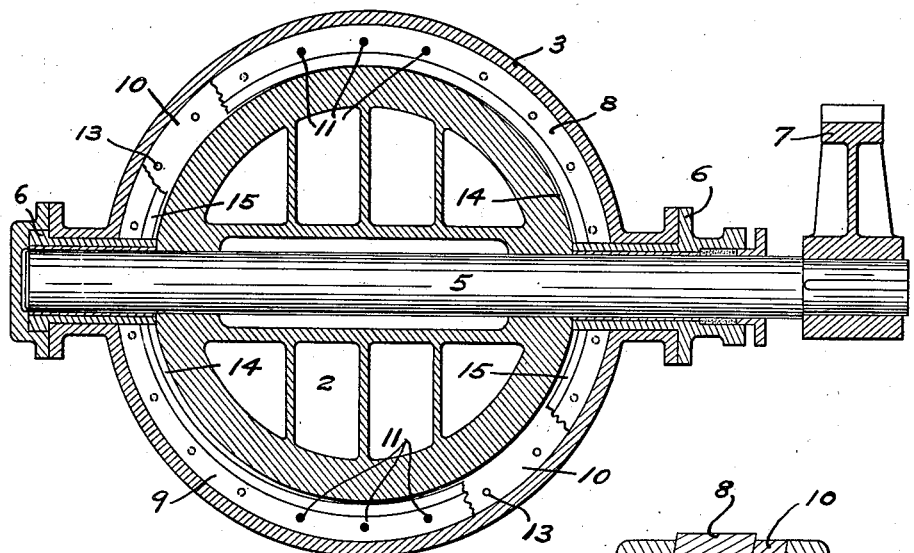
Fig. 1 is a transverse vertical section through a butterfly valve and its casing, showing portions of the packing segments broken away.
Figure 2:
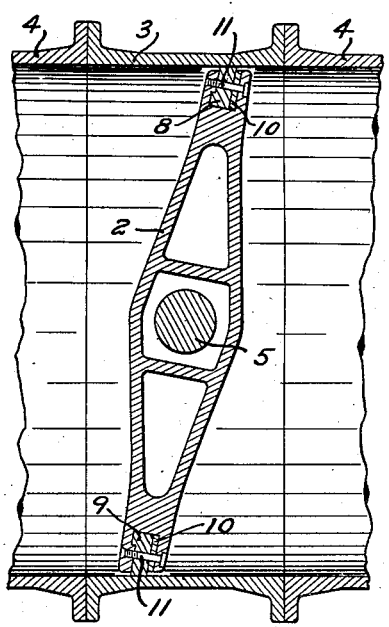
Fig. 2 is a vertical section through a butterfly valve and its casing, the section being taken longitudinally through the casing.
Figure 3:
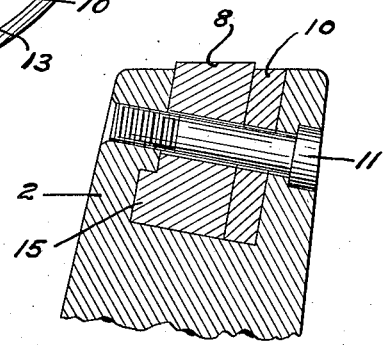
Fig. 3 is an enlarged fragmentary radial section taken through the upper peripheral portion of the valve body.
Figure 4:
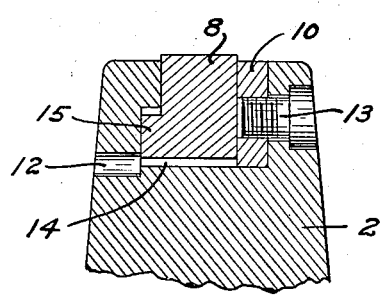
Fig. 4 is an enlarged fragmentary radial section taken through a peripheral portion of the valve body adjacent to the valve actuating shaft.

The butterfly valve specifically illustrated in the drawing comprises in general a butterfly or disk valve body 2, a closed conduit or valve casing 3 associated with pipe line sections 4, a horizontal shaft 5 supported in bearings 6 in the casing 3 and providing a pivot for the valve body 2, mechanism 7 for oscillating the shaft 5 within the bearings 6 in order to open and close the valve, and means for sealing the joint between the valve body 2 and the casing 3. The periphery of the valve body 2 is provided with a recess which with the valve assembled, terminates on opposite sides of the bearings 6. Within each section of the peripheral groove of the valve body 2 is located a resilient packing segment 8, 9, these segments being rigidly attached at their medial portions to the valve body 2 by means of clamping bolts 11 and the ends of the segments 8, 9 being normally biased out toward the valve casing 3. Each of the segments 8, 9 is provided with a lateral projection 15 fitting within a similarly formed recess of the valve body 2, the segments 8, 9 being held against lateral movement by retaining segments 10 which are normally held in position by means of the clamping bolts 11 and by retaining bolts 13 cooperating with the end portions of the retaining segments 10. The spaces 14 existing between the inner side of the end portions of the segments 8, 9 and the valve body 2 communicate with the pressure side of the valve body 2 through a series of openings 12, the ends of the segments 8, 9 being located in close proximity to the bearings 6.

During normal use of the butterfly valve, the actuating mechanism 7 is utilized to adjust the shaft 5 and the valve body 2 about the axis of the shaft 5 and within the bearings 6. When the valve is open the pressures on opposite sides of the body 2 are equalized and the end portions of the segments 8, 9 are free to expand outwardly against the casing wall by virtue of the inherent resiliency of these segments. As the valve is closed the segments 8, 9 are pushed into the peripheral groove of the body 2 by engagement with the casing 3 but the inherent resiliency of the segments 8, 9 may not be sufficient to provide a perfect seal between the body 2 and the casing 3. As the valve comes to closed position, the peripheral face of the segments becomes more and more engaged by the casing and prevents fluid pressure from acting inwardly thereon but the openings 12 however continue to admit fluid under pressure to the spaces 14 existing in back of the segment ends and this unbalanced pressure distorts the segments as irregularities in the casing 3 may appear, in order to maintain the outer faces of the segments 8, 9 in firm engagement with the inner wall of the casing 3. It will be noted that this distortion of the segments 8, 9 by the fluid pressure acting thereagainst, produces an efficient packing for the valve and positively prevents leakage of fluid past the valve body 2. The segments 10 effectively retain the segments 8, 9 in normal operating condition, but permit convenient removal of the packing segments when desired. The retaining set screws 13 cooperating with the clamping bolts 11 serve to retain the segments 10 in normal position without interfering with the functioning of the packing segments 8, 9.

It should be understood that it is not desired to limit the invention to the exact details of construction and of operation herein shown and described, for various modifications within the scope of the claims may occur to persons skilled in the art.

It is claimed and desired to secure by Letters Patent:

1. In combination, a closed conduit, a disk valve within said conduit, packing segments mounted at the periphery of said valve and having their medial portions firmly attached and their ends movable relatively to said valve, and means for admitting fluid under pressure against the end portions of said segments to retain the same in contact with the wall of said conduit.

2. In combination, a closed conduit, a butterfly valve located within and movable about an axis extending transversely through said conduit, packing segments mounted at the periphery of said valve and cooperable with said conduit, and means for admitting fluid under pressure, against inner surfaces of the ends of said segments to cause the latter to prevent leakage of fluid past said valve.

3. In combination, a closed conduit, a butterfly valve located within and movable about an axis extending transversely through the center of said conduit, said valve having a peripheral recess on opposite sides of said axis, a packing segment mounted within each of said recesses, each of said segments having freely movable ends, and means for admitting fluid under pressure to said segment ends to distort and retain the same in contact with the wall of said conduit when said valve is closed.

4. In combination, means forming a closed conduit, a disk valve within said conduit, a shaft extending across said conduit and supporting said valve for movement about the shaft axis, said valve having peripheral recesses extending up to said shaft, a packing segment mounted within each of said recesses, each of said segments being medially fixed and having freely movable ends adjacent to said shaft, and means for admitting fluid under pressure to said segment ends to distort and retain the same in contact with the wall of said conduit when the valve is closed.

5. In combination, means forming a closed conduit, a disk valve within said conduit, a shaft extending across said conduit and supporting said valve for movement about the shaft axis, said valve being provided with peripheral recesses extending up to said shaft, a packing segment within each of said recesses, and means for admitting fluid under pressure to the inner surface of each of said segments to maintain the same in contact with the wall of said conduit when said valve is closed.

6. In combination, means forming a closed conduit, a disk valve within said conduit, a shaft extending across said conduit and supporting said valve for movement about the shaft axis, the periphery of said valve being provided with a recess of greatest width at the bottom, a packing segment held within said recess by virtue of the increased width at the bottom thereof, and means for admitting fluid under pressure to the inner surface of said segment to maintain the same in contact with the wall of said conduit when said valve is closed.

7. In combination, means forming a closed conduit, a disk valve within said conduit, a shaft extending across said conduit and supporting said valve for movement about the shaft axis, said valve being provided with a peripheral recess, a packing segment movable within said recess, a keeper segment for retaining said packing segment within said recess, and means for admitting fluid under pressure to the inner surface of said packing segment to maintain the same in contact with the wall of said conduit when said valve is closed.

In testimony whereof, the signature of the inventor is affixed hereto.

WILLIAM M. WHITE.